(12) United States Patent
Milligan et al.

(10) Patent No.: US 11,973,296 B2
(45) Date of Patent: Apr. 30, 2024

(54) HIGHLY CONFIGURABLE AND MODULAR HIGH-SPEED CONNECTOR SYSTEM

(71) Applicant: SMITHS INTERCONNECT AMERICAS, INC., Kansas City, KS (US)

(72) Inventors: Robert Milligan, Costa Mesa, CA (US); Juan M. Ramos, Costa Mesa, CA (US); Richard Johannes, Trabuco Canyon, CA (US)

(73) Assignee: SMITHS INTERCONNECT AMERICAS, INC., Kansas City, KS (US)

( * ) Notice: Subject to any disclaimer, the term of this patent is extended or adjusted under 35 U.S.C. 154(b) by 99 days.

(21) Appl. No.: 16/770,921

(22) PCT Filed: Dec. 7, 2018

(86) PCT No.: PCT/US2018/064585
§ 371 (c)(1),
(2) Date: Jun. 8, 2020

(87) PCT Pub. No.: WO2019/113524
PCT Pub. Date: Jun. 13, 2019

(65) Prior Publication Data
US 2021/0175668 A1 Jun. 10, 2021

Related U.S. Application Data

(60) Provisional application No. 62/596,664, filed on Dec. 8, 2017.

(51) Int. Cl.
*H01R 13/6582* (2011.01)
*G02B 6/42* (2006.01)
*H01R 13/518* (2006.01)

(52) U.S. Cl.
CPC ....... *H01R 13/6582* (2013.01); *G02B 6/4277* (2013.01); *G02B 6/428* (2013.01); *G02B 6/4293* (2013.01); *H01R 13/518* (2013.01)

(58) Field of Classification Search
CPC .......................... H01R 13/518; H01R 13/6582
(Continued)

(56) References Cited

U.S. PATENT DOCUMENTS

| 6,305,961 | B1 | 10/2001 | Szilagyi et al. |
| 6,595,801 | B1 | 7/2003 | Leonard et al. |

(Continued)

FOREIGN PATENT DOCUMENTS

| CN | 1201280 | 12/1998 |
| CN | 102427188 | 4/2012 |

(Continued)

OTHER PUBLICATIONS

International Search Report and Written Opinion of the International Searching Authority (dated Apr. 29, 2019) for Corresponding International PCT Patent Application No. PCT/US2018/064585, filed Dec. 7, 2018.

*Primary Examiner* — Gary F Paumen
(74) *Attorney, Agent, or Firm* — Snell & Wilmer LLP

(57) ABSTRACT

A shielded modular connector system includes a first portion having a first housing and a plurality of first contact modules, the first housing including a first interface surface and a first interface perimeter surrounding the first interface surface, a first plurality of bays to receive the plurality of first contact modules, and a grounding ring. The system further includes a second portion configured to mate with the first portion, and having a second housing and a plurality of second contact modules. The second housing includes a second interface surface and a second interface perimeter surrounding the second interface surface and designed to (Continued)

face the first interface surface, a second plurality of bays configured to receive the plurality of second contact modules, and a backshell located along at least a portion of the second interface perimeter and extending away from the second interface surface.

19 Claims, 16 Drawing Sheets

(58) Field of Classification Search
USPC .................................................. 439/364, 701
See application file for complete search history.

(56) References Cited

U.S. PATENT DOCUMENTS

| | | | | |
|---|---|---|---|---|
| 7,867,040 | B2* | 1/2011 | Yu | H01R 13/518 |
| | | | | 439/701 |
| 8,550,839 | B2* | 10/2013 | Fabian | H01R 13/506 |
| | | | | 439/701 |
| 8,613,996 | B2* | 12/2013 | Farooq | B32B 3/02 |
| | | | | 428/192 |
| 2002/0146931 | A1 | 10/2002 | Richmond et al. | |
| 2007/0123065 | A1 | 5/2007 | Rosenfeldt et al. | |
| 2007/0190851 | A1* | 8/2007 | Nicoletta | H01L 23/057 |
| | | | | 257/E23.189 |
| 2008/0057758 | A1 | 3/2008 | Water et al. | |
| 2010/0124836 | A1 | 5/2010 | Beer | |
| 2011/0294348 | A1 | 12/2011 | McAlonis et al. | |
| 2012/0088413 | A1 | 4/2012 | Kataoka et al. | |
| 2014/0196943 | A1 | 7/2014 | Hirschy | |
| 2015/0031238 | A1 | 1/2015 | Davis et al. | |
| 2015/0372428 | A1 | 12/2015 | Long | |
| 2017/0085035 | A1 | 3/2017 | Briant et al. | |

FOREIGN PATENT DOCUMENTS

| | | |
|---|---|---|
| CN | 103928796 | 7/2014 |
| CN | 104348011 | 2/2015 |
| EP | 1174959 | 1/2002 |

* cited by examiner

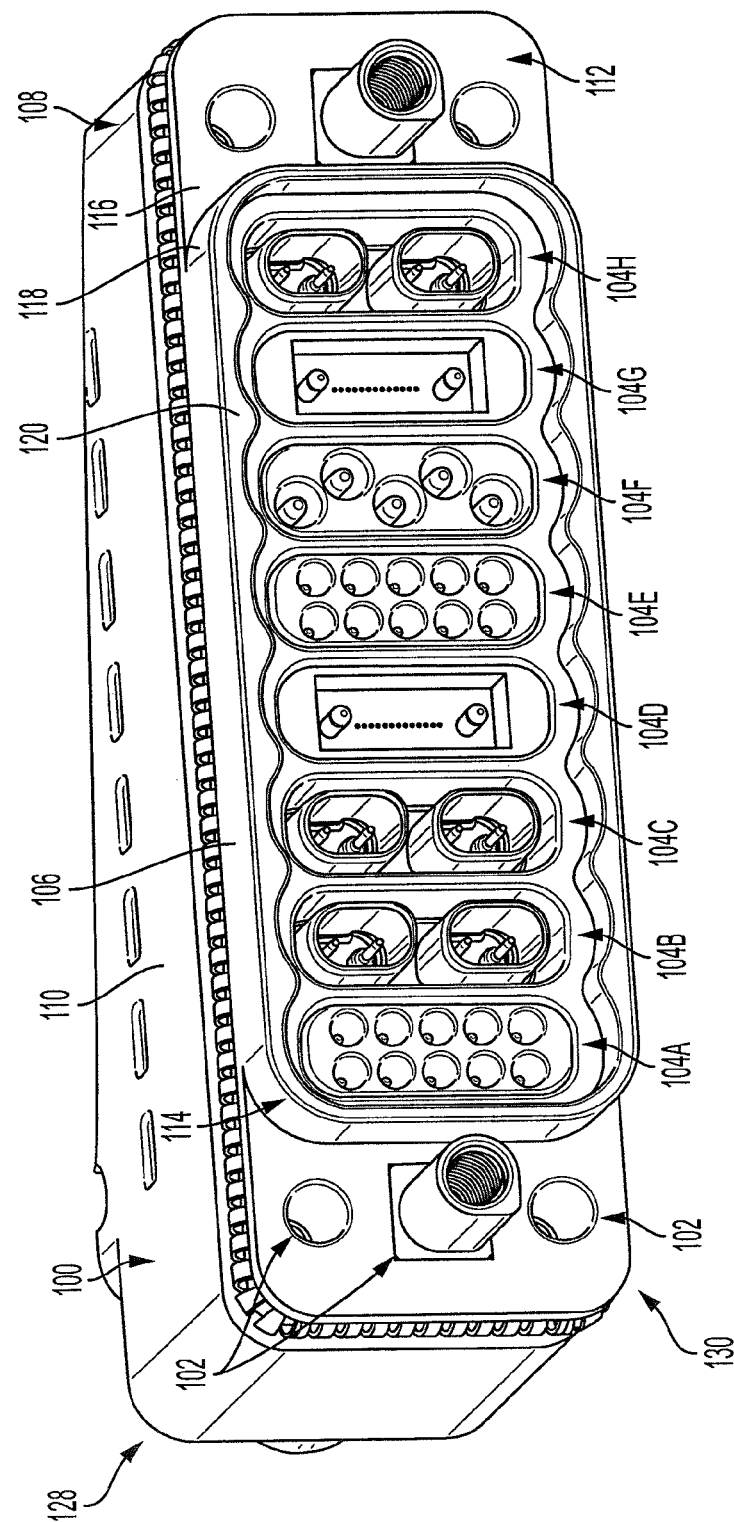

HIGHLY CONFIGURABLE AND MODULAR HIGH-SPEED CONNECTOR SYSTEM

CROSS REFERENCE TO RELATED APPLICATIONS

This application claims the benefit and priority of U.S. Provisional Patent Application No. 62/596,664, titled "Highly Configurable and Modular High Speed Connector System" and filed on Dec. 8, 2017, the entire contents of which is herein incorporated by reference in its entirety.

BACKGROUND

Field

The present invention relates generally to connectors and, more particularly, to modular connectors capable of transmitting multiple types of electrical and optical signals.

Background of the Invention

Various connectors may be used to provide connections between components, such as between an edge card and a motherboard in a computing system. Conventional connectors only transmit a single type of data. For example, a conventional connector may receive and transmit a single type of high-speed data or a single type of optical signal. Thus, if multiple types of data are to be transmitted between an edge card and a motherboard, at least one connector for each type of data to be transmitted must be installed. The design of such conventional connectors typically requires that many different connectors be installed on a printed circuit board (PCB), reducing space and increasing clutter on the PCB, and resulting in an increased cost of manufacturing the PCB.

SUMMARY

Described herein is a shielded modular connector system. The system includes a first portion having a first housing and a plurality of first contact modules. The first housing includes a first interface surface and a first interface perimeter surrounding the first interface surface. The first housing further includes a first plurality of bays configured to receive the plurality of first contact modules, the first interface surface having an opening for each bay of the first plurality of bays such that the plurality of first contact modules are accessible. The first housing further includes a grounding ring located along at least a portion of the first interface perimeter. The system further includes a second portion configured to mate with the first portion, and having a second housing and a plurality of second contact modules. The second housing includes a second interface surface and a second interface perimeter surrounding the second interface surface, the second interface surface configured to face the first interface surface when the first portion is mated with the second portion. The second housing further includes a second plurality of bays configured to receive the plurality of second contact modules, the second interface surface having an opening for each bay of the second plurality of bays such that the plurality of second contact modules are accessible, the plurality of second contact modules and the plurality of first contact modules being configured to connect when the first portion is mated with the second portion. The second housing further includes a backshell located along at least a portion of the second interface perimeter and extending away from the second interface surface, the backshell configured to engage the grounding ring when the first portion is mated with the second portion to provide electromagnetic interference protection to the plurality of first contact modules and the plurality of second contact modules.

Also described is a shielded modular connector system. The system includes a first portion having a first housing with a first interface surface and a first plurality of bays. The first portion further includes a first optical contact module and a first high-speed contact module each configured to be received by one of the first plurality of bays. The system further includes a second portion configured to mate with the first portion and having a second housing with a second interface surface configured to interface with the first interface surface and a second plurality of bays. The second portion further includes a second optical contact module and a second high-speed contact module configured to be connected to the first optical contact module and the first high-speed contact module, respectively, and each configured to be received by one of the second plurality of bays.

Also described is a shielded modular connector system. The system includes a first portion having a first housing with a first interface surface and defining a first plurality of bays. The first portion further includes a first optical contact module and a first high-speed contact module each configured to be received by one of the first plurality of bays. The first portion further includes a grounding ring located along at least a portion of the first interface surface. The system further includes a second portion configured to mate with the first portion and having a second housing with a second interface surface configured to interface with the first interface surface and defining a second plurality of bays. The second portion further includes a second optical contact module and a second high-speed contact module configured to be connected to the first optical contact module and the first high-speed contact module, respectively, and each configured to be received by one of the second plurality of bays. The second portion further includes a backshell located along at least a portion of the second interface surface and extending away from the second interface surface, the backshell configured to engage the grounding ring when the first portion is mated with the second portion.

BRIEF DESCRIPTION OF THE DRAWINGS

FIG. 2B is an annotated version of FIG. 2A according to an embodiment of the present disclosure;

DETAILED DESCRIPTION

Various conventional connectors may individually provide high-speed, signal, power, and fiber optic connections at the board level. However, these connectors are segmented, offering only one connection per housing. As a result, many different and space-consuming connectors must be used. Often the connector does not have integral electromagnetic interference (EMI) shielding.

None of these conventional connectors are modular or configurable. The system disclosed herein offers a modular configurable solution of housing many different connector types within one connector housing.

The connector system may include electrical signals (including high-speed electrical signals) and optical signals in a common housing with protection for the system with an EMI protection system.

While the connector system is shown in the FIGS. as having eight (8) modules, the system may have any number of modules, such as 2, 4, 8, 12, 16, or 24 modules, for example.

In addition, the connector system may be used in any context where multiple types of connectors are present, such as space systems, personal or business computing, aerospace, military, automotive, or medical, for example. In particular, when fiber optic signals are communicated using the connector, the applications may be standard applications or radiation-hardened applications. The systems disclosed herein protect the fiber optic connection from radiation, such that the fiber optic cable is not damaged from radiation.

The connector system described herein optimizes the space available on an edge of a printed circuit board, for example. This results in increased space and contact density, both at the card edge and within the entire system. The EMI protection established by the system described herein provides for increased performance.

Figure 1A:
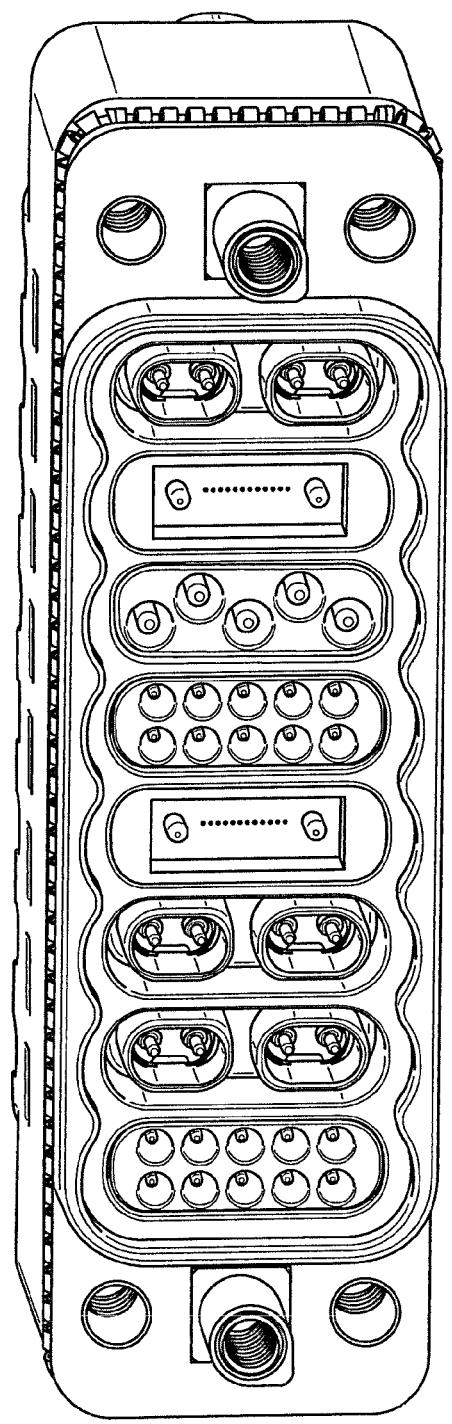
FIG. 1A is a perspective view of a first portion of a highly configurable and modular high-speed connector system according to an embodiment of the present disclosure.
Figure 1B:
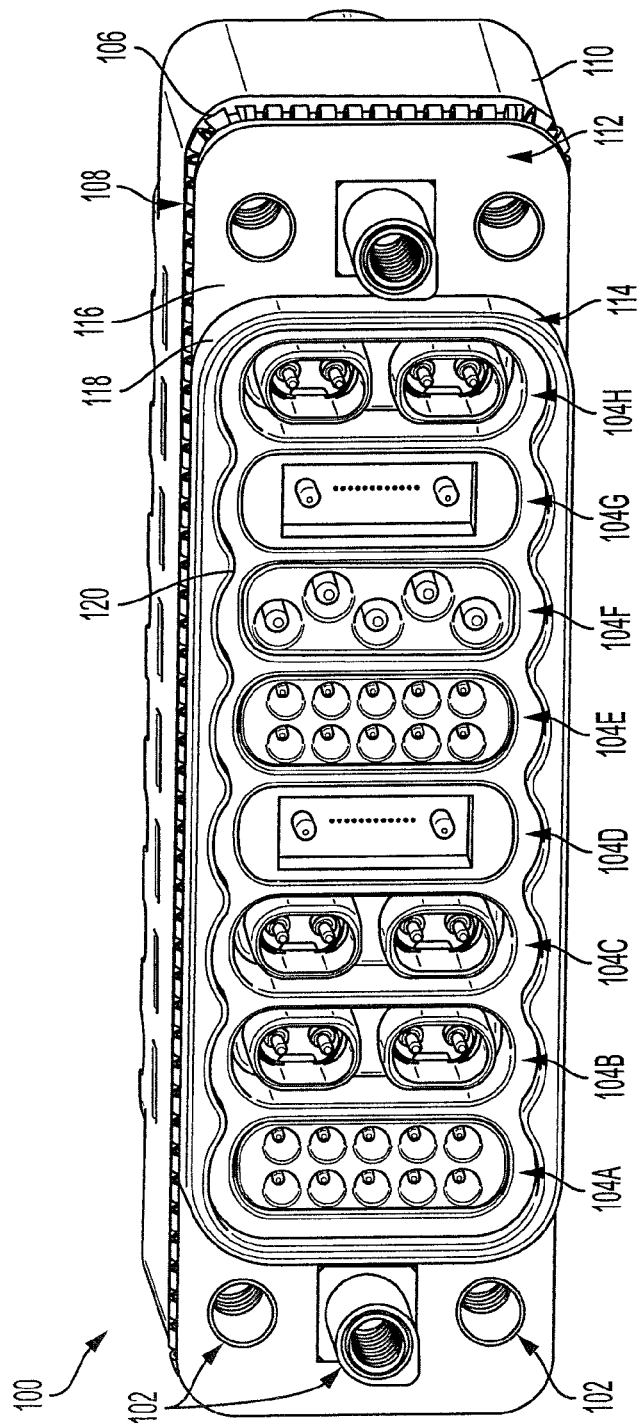
FIG. 1B is an annotated version of FIG. 1A according to an embodiment of the present disclosure.

FIGS. 1A and 1B show a perspective view of a first portion 100 of a highly configurable and modular high-speed connector system. The first portion 100 includes a first housing 110. The first housing 110 may be made of a metal, such as aluminum, or a conductive polymer. The first housing 110 includes attachment units 102 configured to receive corresponding attachment units on the second portion 200, to establish and reinforce the connection between the first portion 100 and the second portion 200. In some embodiments, the attachment units 102 may include threaded screws and sockets. In some embodiments, the attachment units 102 may include a keying, rendering the attachment unit 102 asymmetrical, such that the second portion 200 and the first portion 100 may only be mated in a particular orientation.

The first housing 110 has a face 112, which has an interface surface 116, surrounded by an interface perimeter 108. The first housing 110 is configured to house a plurality of contact modules 104. In that regard, the first housing 110 may define a plurality of bays 122. Each of the bays 122 may receive a respective contact module 104. The contact modules 104 may be replaced and interchanged depending on the requirements of the system in which the connector is being used. The first housing 110 has multiple openings for exposing the contact modules 104 to make the contact modules 104 accessible.

As shown, the first portion 100 includes a low-speed signal contact module 104A, a high-speed signal contact module 104B, a second high-speed signal contact module 104C, a fiber optics contact module 104D, a second low-speed signal contact module 104E, a power connector contact module 104F, a second fiber optics contact module 104G, and a third high-speed signal contact module 104H. However, any configuration of contact modules may be used. Each bay receiving each contact module 104 is shielded such that interference between contact modules is prevented. Conventionally, fiber optic connections have not been integrated into connectors having other types of connections, such as high-speed signal connections.

The first housing 110 may also have an inner wall 114 surrounding the openings for the contact modules 104. The inner wall 114 has a front surface 120 which is raised, when compared to the interface surface 116. The inner wall 114 also has a side surface 118 which travels around the perimeter of the inner wall 114.

The first portion 100 also includes a grounding ring 106, which is located on at least a portion of the interface perimeter 108. In some embodiments, the grounding ring 106 is located on the entire interface perimeter 108. The grounding ring 106 may contact a backshell of the second portion of the system in order to provide EMI protection. The grounding ring 106 may be an integral part of the first housing 110 or may be a separate part attached to the first housing 110.

Figure 2A:
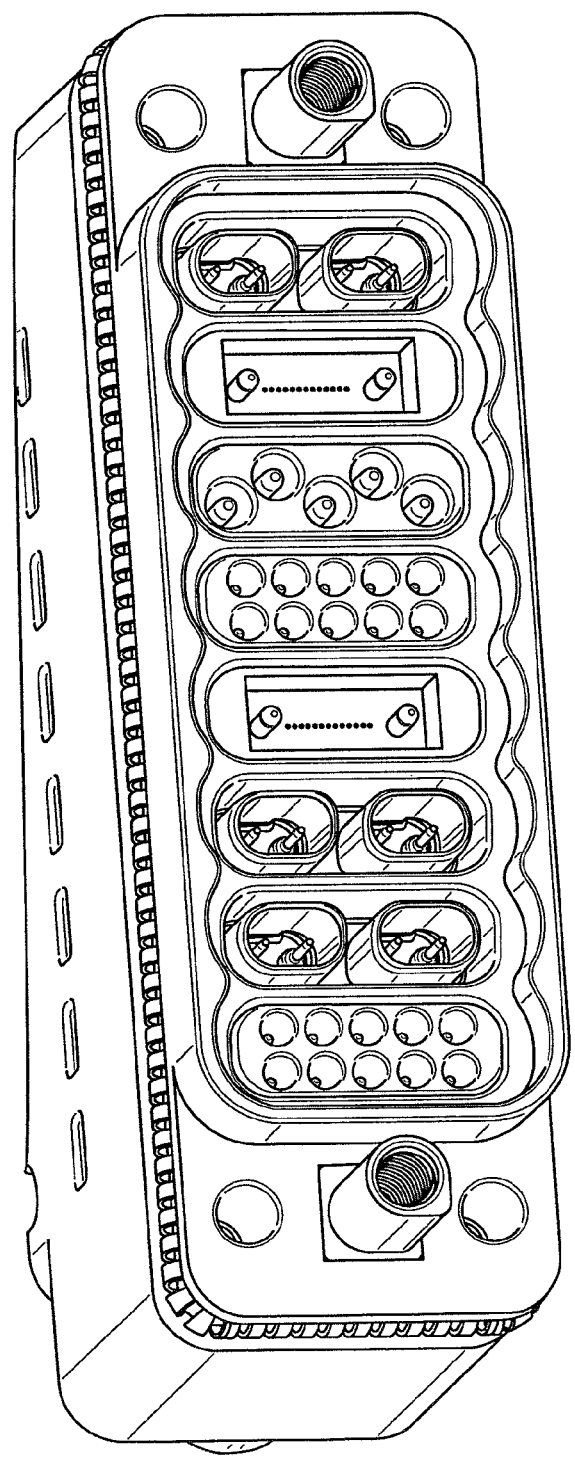
FIG. 2A is a perspective view of a first portion of a highly configurable and modular high-speed connector system according to an embodiment of the present disclosure.

As shown in FIGS. 2A and 2B, the first portion 100 may have a front end 130 and a back end 128. The back end 128 may connect to a cable or may connect to a printed circuit board. The front end 130 is configured to face a front end of the second portion 200.

Figure 3A:
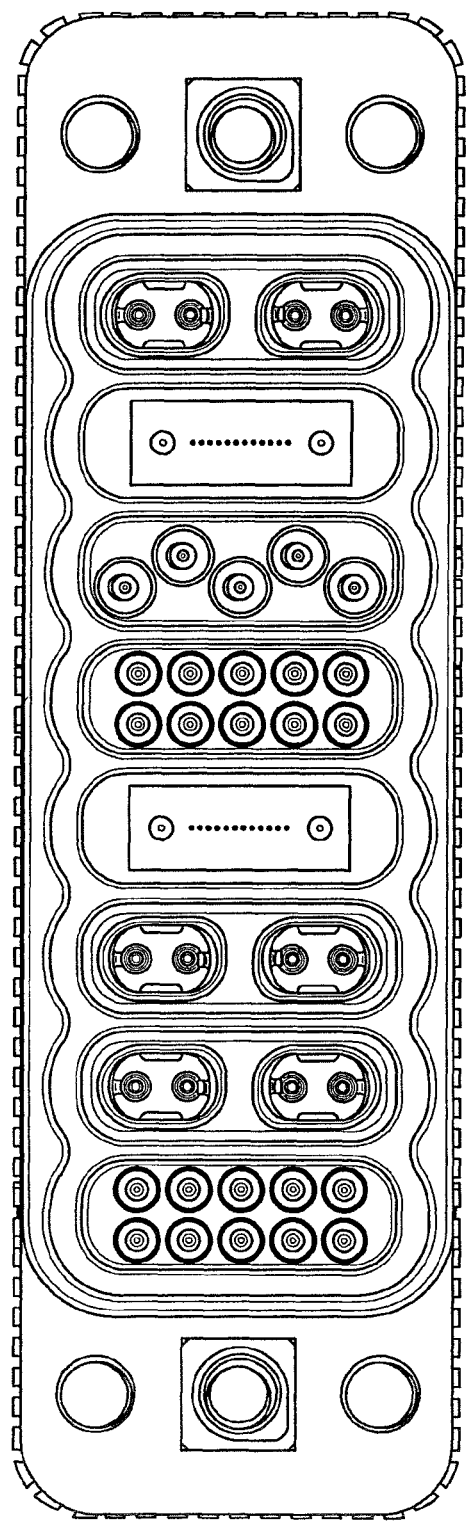
FIG. 3A is a front view of a first portion of a highly configurable and modular high-speed connector system according to an embodiment of the present disclosure.
Figure 3B:
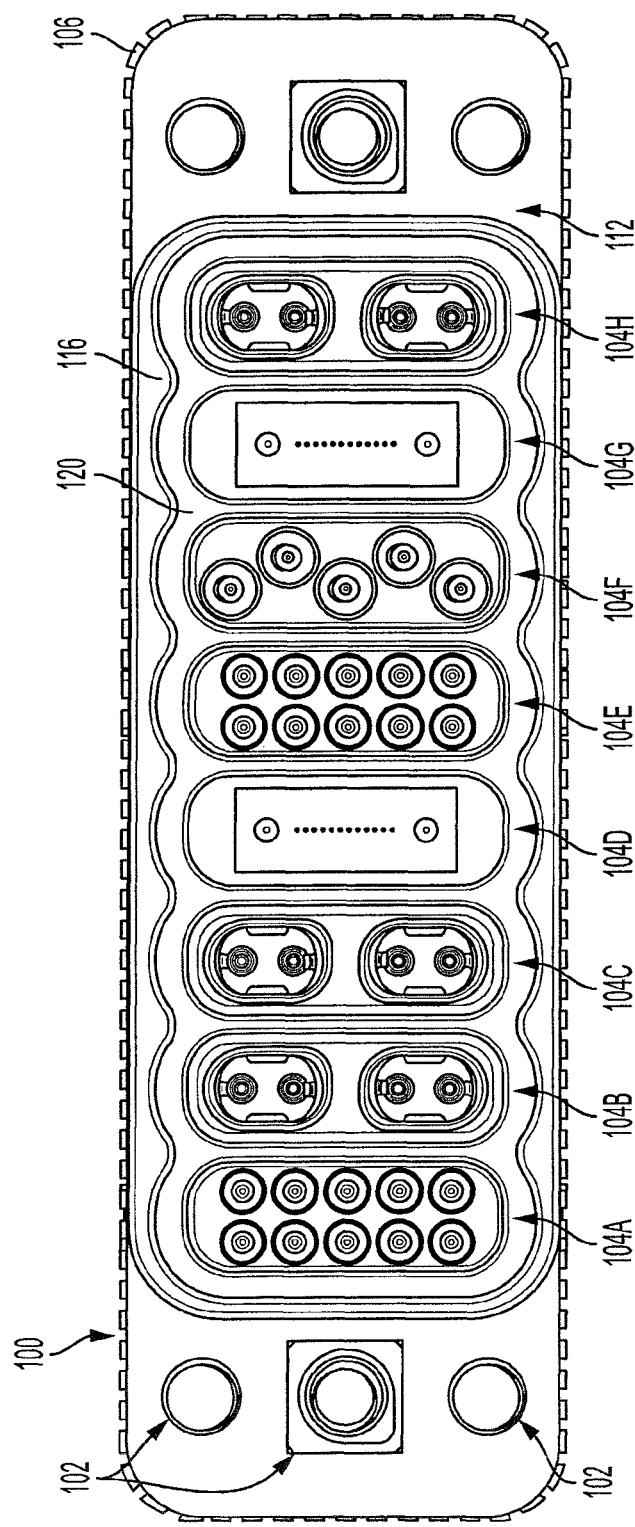
FIG. 3B is an annotated version of FIG. 3A according to an embodiment of the present disclosure.

FIGS. 3A and 3B show a front view of the first portion 100 of the highly configurable and modular high-speed connector system.

Figure 4A:
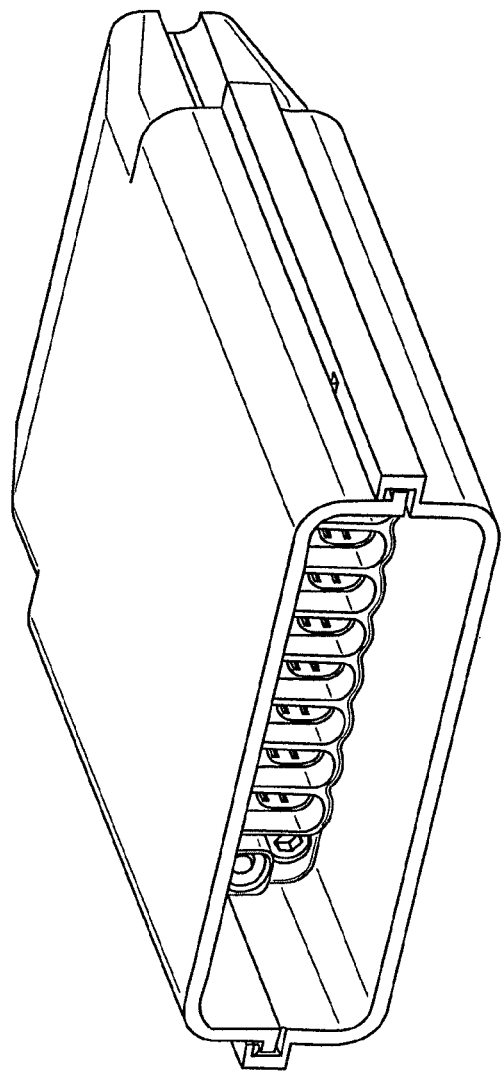
FIG. 4A is a perspective view of a second portion of a highly configurable and modular high-speed connector system according to an embodiment of the present disclosure.
Figure 4B:
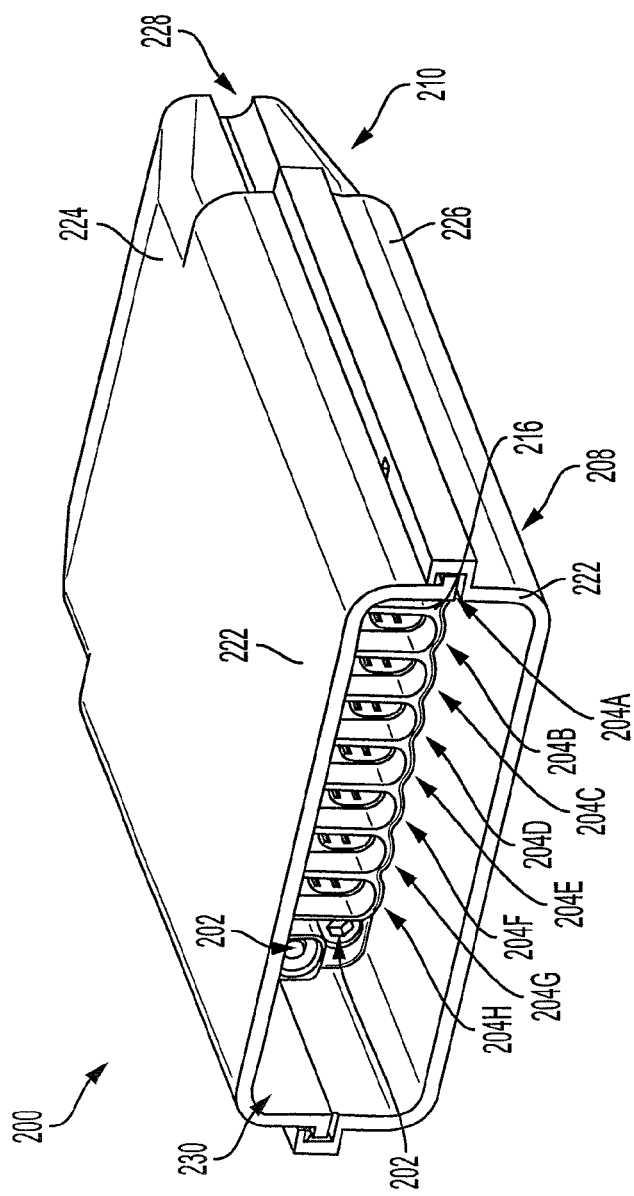
FIG. 4B is an annotated version of FIG. 4A according to an embodiment of the present disclosure.

FIGS. 4A and 4B show a perspective view of a second portion of the highly configurable and modular high-speed connector system.

The second portion 200 includes a second housing 210. The second housing 210 may be made of a metal, such as aluminum, or a conductive polymer. The first housing 110 and the second housing 210 may be made of the same or different materials. The second housing 210 includes attachment units 202 configured to engage the corresponding attachment units 102 of the first housing 110.

The second housing 210 has an interface surface 216 surrounded by an interface perimeter 208. The second housing 210 is configured to house a plurality of contact modules 204, which are the complements of the contact modules 104 of the first portion 100. The contact modules 204 may be replaced and interchanged depending on the requirements of the system in which the connector is being used. The second housing 210 has multiple openings for exposing the contact modules 204 to make the contact modules 204 accessible.

In order for the contact modules 104 and the contact modules 204 to properly line up, the arrangement of contact modules in the second portion 200 must be the mirror image of the arrangement of contact modules in the first portion 100. This is reflected in the lettering of the contact modules 204.

The contact modules 104 which are housed by the first portion 100 may be the pin ends of the contact connection, or may be the socket ends of the contact connection. Accordingly, the contact modules of the second portion 200 are the other complementary ends of the connection. For example, if the contact modules 104 of the first portion 100 are the pin ends, the contact modules 204 of the second portion 200 are the socket ends, and if the contact modules 104 of the first portion 100 are the socket ends, the contact modules 204 of the second portion 200 are the pin ends.

The second housing 210 may also have an inner wall surrounding the openings for the contact modules 204. The inner wall has a front surface which is raised, when compared to the interface surface 216. The inner wall also has a side surface which travels around the perimeter of the inner wall. In some embodiments, the inner wall of the second housing 210 may fit within the inner wall 114 of the first housing 110. In some embodiments, the inner wall 114 of the first housing 110 fits within the inner wall of the second housing 210. The overlapping inner walls of the first portion 100 and the second portion 200 may provide EMI protection, as well as lateral stability for the connections between the contact modules 104 and 204.

The second housing 210 may be split into two halves, a top half 224 and a bottom half 226. The halves may be separated in order to adjust the contact modules 204. In some embodiments, the second housing 210 may include a single component. In some embodiments, the second housing 210 may include more than two portions, such that it is split into three, four, or more pieces.

The second portion 200 also includes a backshell 222, which is located on at least a portion of the interface perimeter 208. In some embodiments, the backshell 222 is located on the entire interface perimeter 208. The grounding ring 106 of the first portion 100 makes contact with the backshell 222 of the second portion 200 in order to provide EMI protection.

The second portion 200 may have a front end 230 and a back end 228. The back end 228 may connect to a cable or may connect to a printed circuit board. The front end 230 is configured to face the front end 130 of the first portion 100.

Figure 5A:
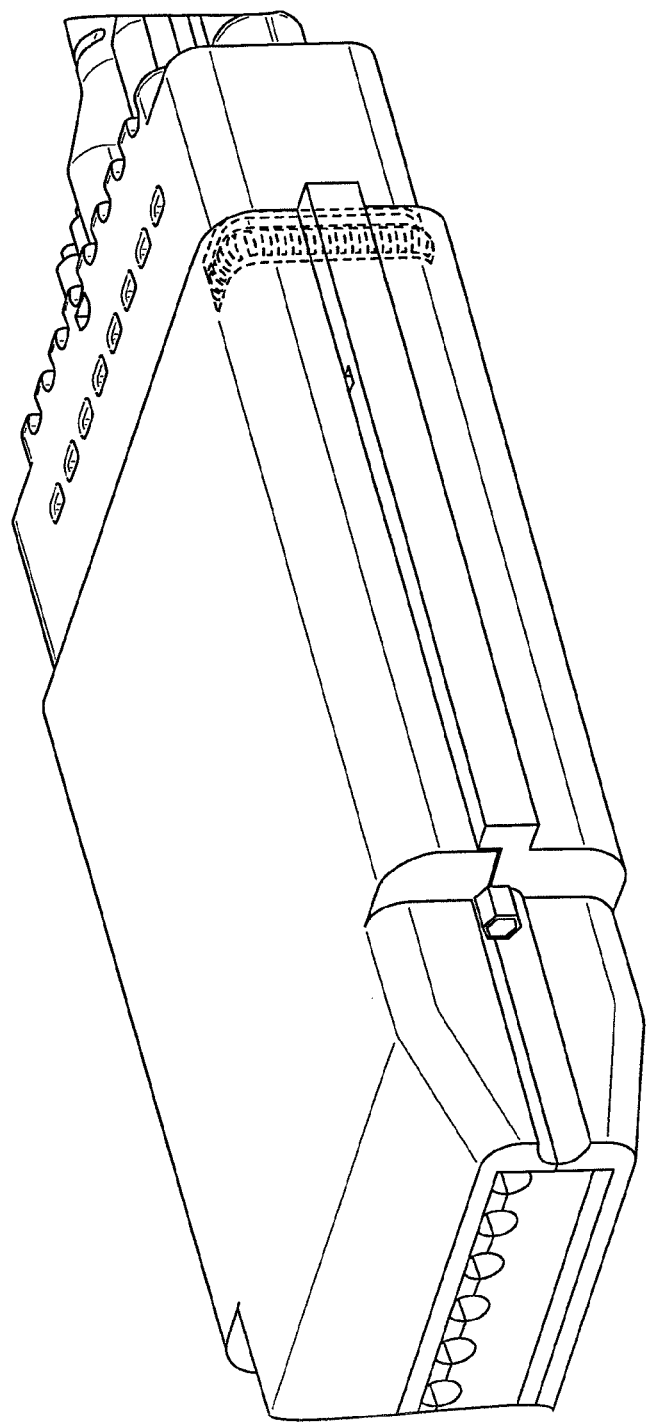
FIG. 5A is a perspective view of a first portion and a second portion of a highly configurable and modular high-speed connector system being connected according to an embodiment of the present disclosure.
Figure 5B:
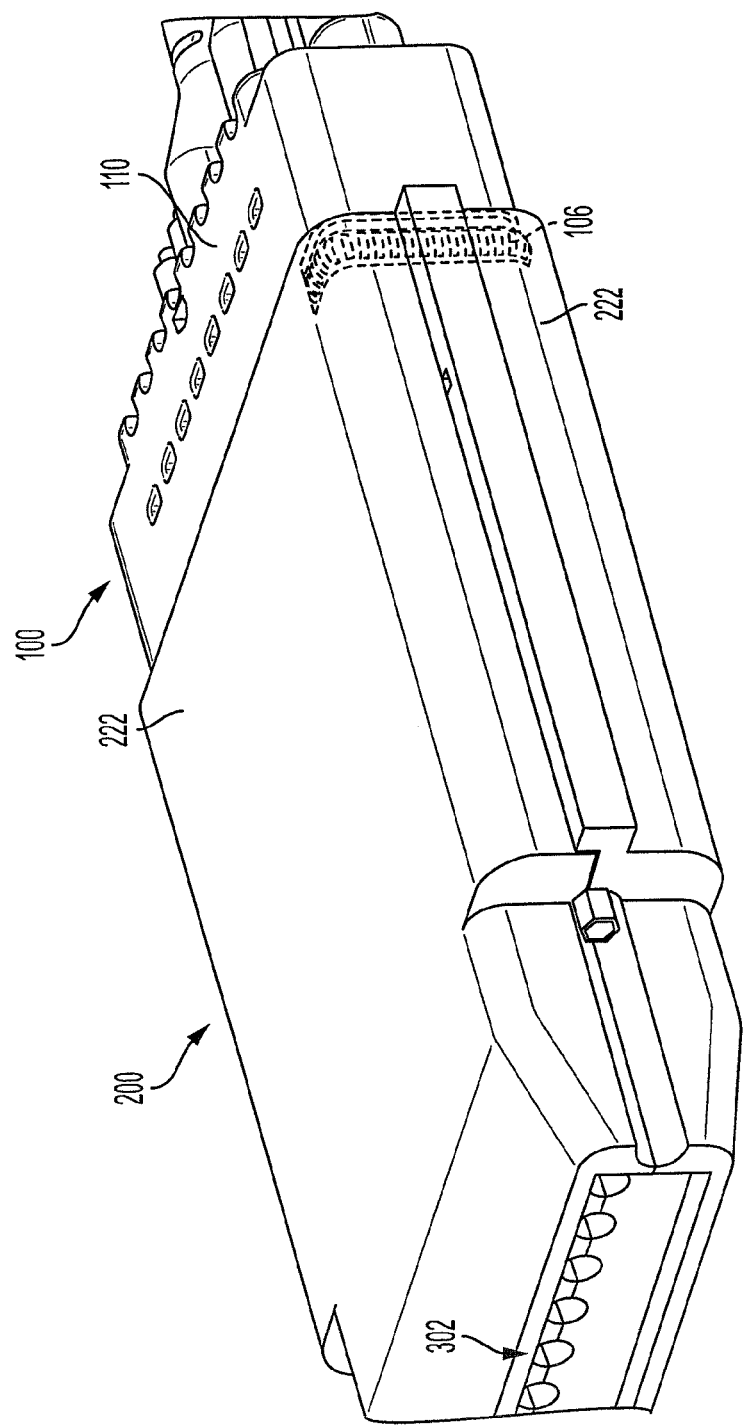
FIG. 5B is an annotated version of FIG. 5A according to an embodiment of the present disclosure.
Figure 6A:
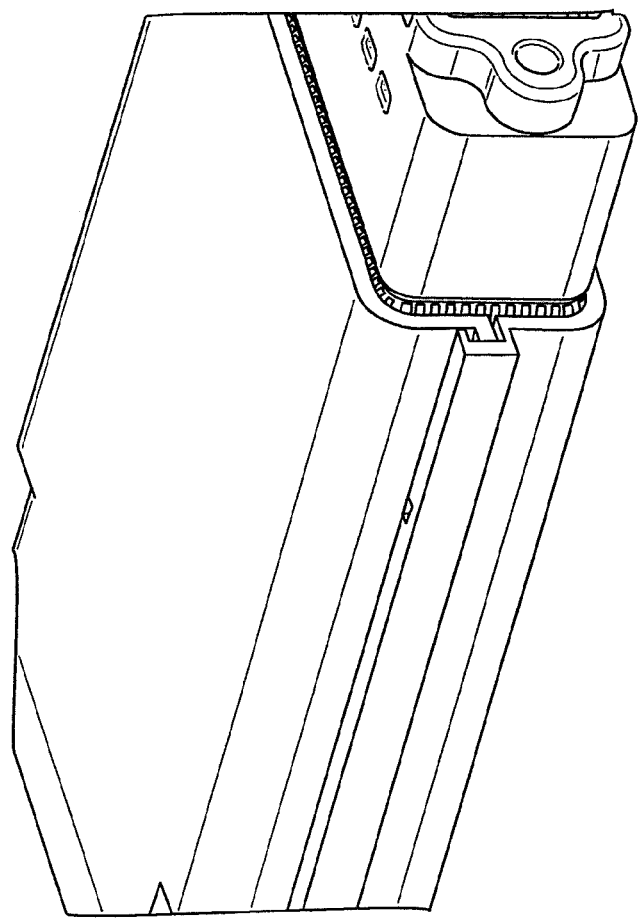
FIG. 6A is a perspective view of a first portion and a second portion of a highly configurable and modular high-speed connector system being connected according to an embodiment of the present disclosure.
Figure 6B:
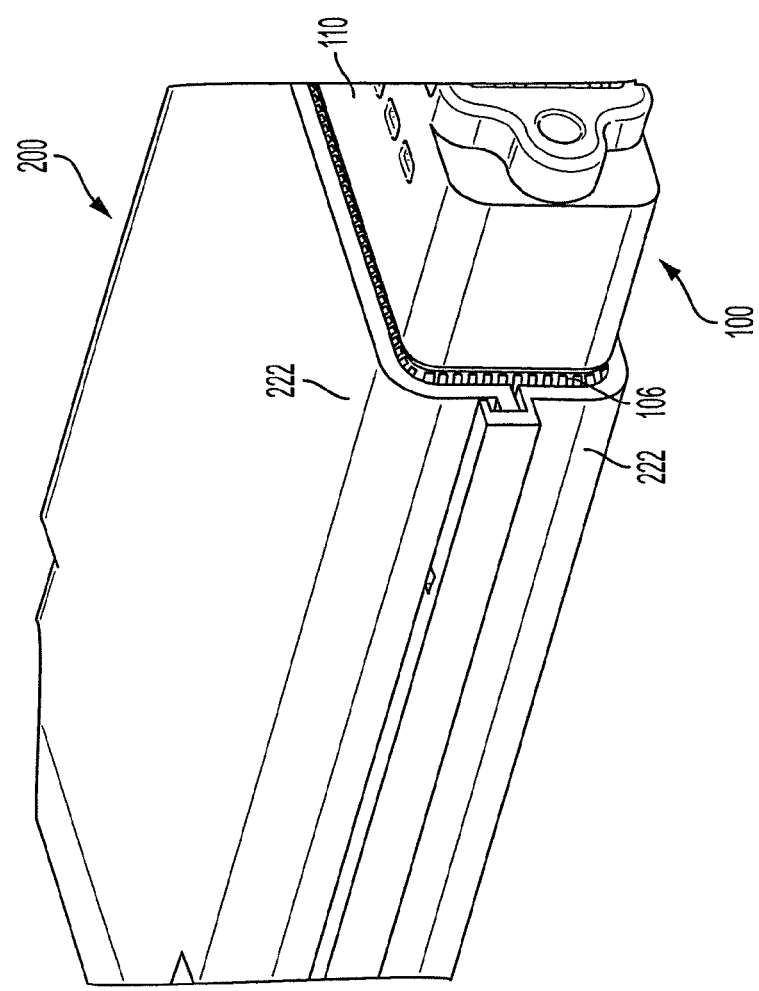
FIG. 6B is an annotated version of FIG. 6A according to an embodiment of the present disclosure.

FIGS. 5A and 5B are perspective views of the first portion 100 and the second portion 200 of the highly configurable and modular high-speed connector system being connected. In some embodiments, at least one of the first portion 100 or the second portion 200 is fixedly attached to at least one of an electromagnetic interference (EMI) bulkhead or a faraday cage bulkhead The second portion 200, on the back end 228, may have a plurality of openings to be occupied by wires or cables to connect to the contact modules 204. The first portion 100 may have a similar plurality of opening on the back end 128 of the first portion 100.

FIGS. 5A, 5B, 6A, and 6B illustrate the backshell 222 of the second portion 200 engaging the grounding ring 106 of the first portion 100. The grounding ring 106 may extend beyond the interface perimeter 108 in order to provide an interference fit with the backshell 222 when the first portion 100 and the second portion 200 are mated.

The system may be a VPX connection connecting a motherboard to a motherboard, a motherboard to a daughter card, or a cable to a board, for example. A user may be able to configure the various contact modules 104 and 204 of the system.

When the contact module is a fiber optics contact module, the fiber optics communication may be an active transmission or a passive transmission. When the fiber optics communication is an active transmission, a transceiver may be integrated into the system (e.g., into the first portion 100 and/or the second portion 200). The transceiver may allow the system to transmit an active transmission, such that a fiber optic signal may be received and an electrical signal may be output, whereas with a passive transmission, a fiber optic signal is received and a fiber optic signal is output.

Figure 7:
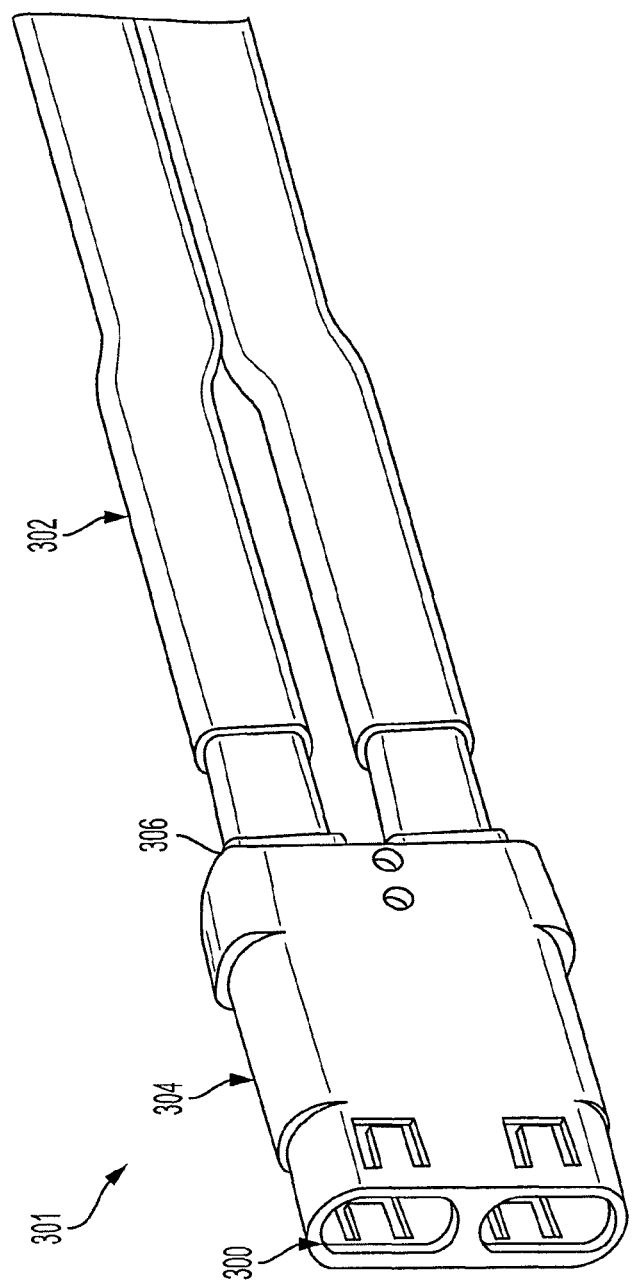
FIG. 7 is a drawing of a contact module usable in the first portion of FIG. 1A or the second portion of FIG. 4A according to an embodiment of the present disclosure.

Referring now to FIG. 7, a contact module 301 may be used in the first portion 100 of FIG. 1B or the second portion 200 of FIG. 4B. The contact module 301 may be a high-speed contact module and may thus transmit and receive high-speed data signals. Where used throughout, a high-speed data signal may correspond to a signal having a transfer rate of greater than 1 Megabits per second (Mbps), and a low-speed data signal may correspond to a signal having a transfer rate of less than 1 Mbps.

The contact module 301 may be received by a bay of a respective housing, such as a bay 122 of the first housing 110 of FIG. 1B. The contact module 301 may have an interface surface 300 which may interface with a corresponding interface surface of a complementary contact module. The contact module 301 may further have a contact body 304 designed to be received by a bay, such as one of the bays 122 of the first housing 110 of FIG. 1B. The contact module 301 may further include a back end 306 designed to be connected to an external component. As shown, the back end 306 of the contact module 301 is connected to a cable 302, which may be used to electrically connect the contact module 301 to an external component (such as a PCB board).

Figure 8A:
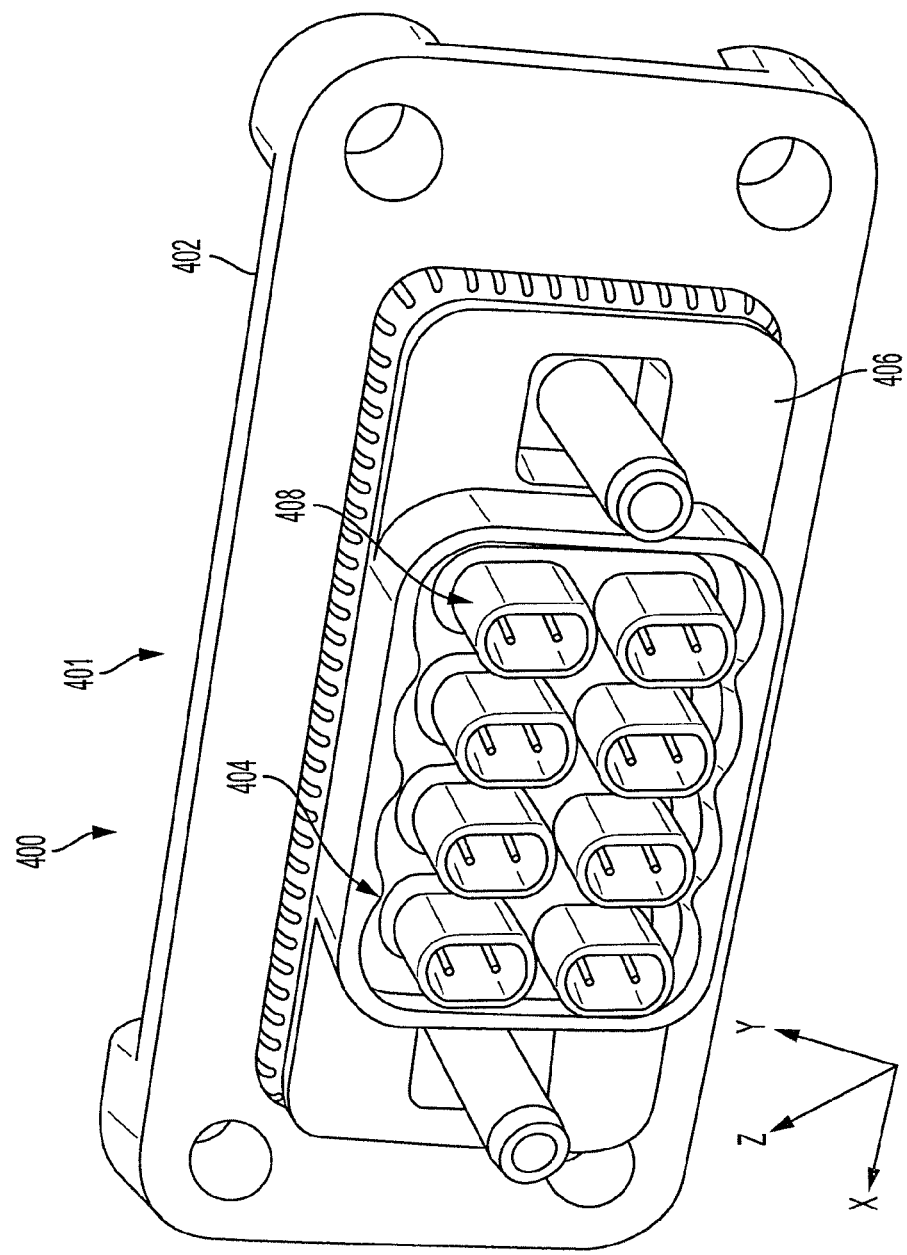
FIG. 8A is a drawing of an interface surface of a first portion of a highly configurable and modular high-speed connector system according to an embodiment of the present disclosure.
Figure 8B:
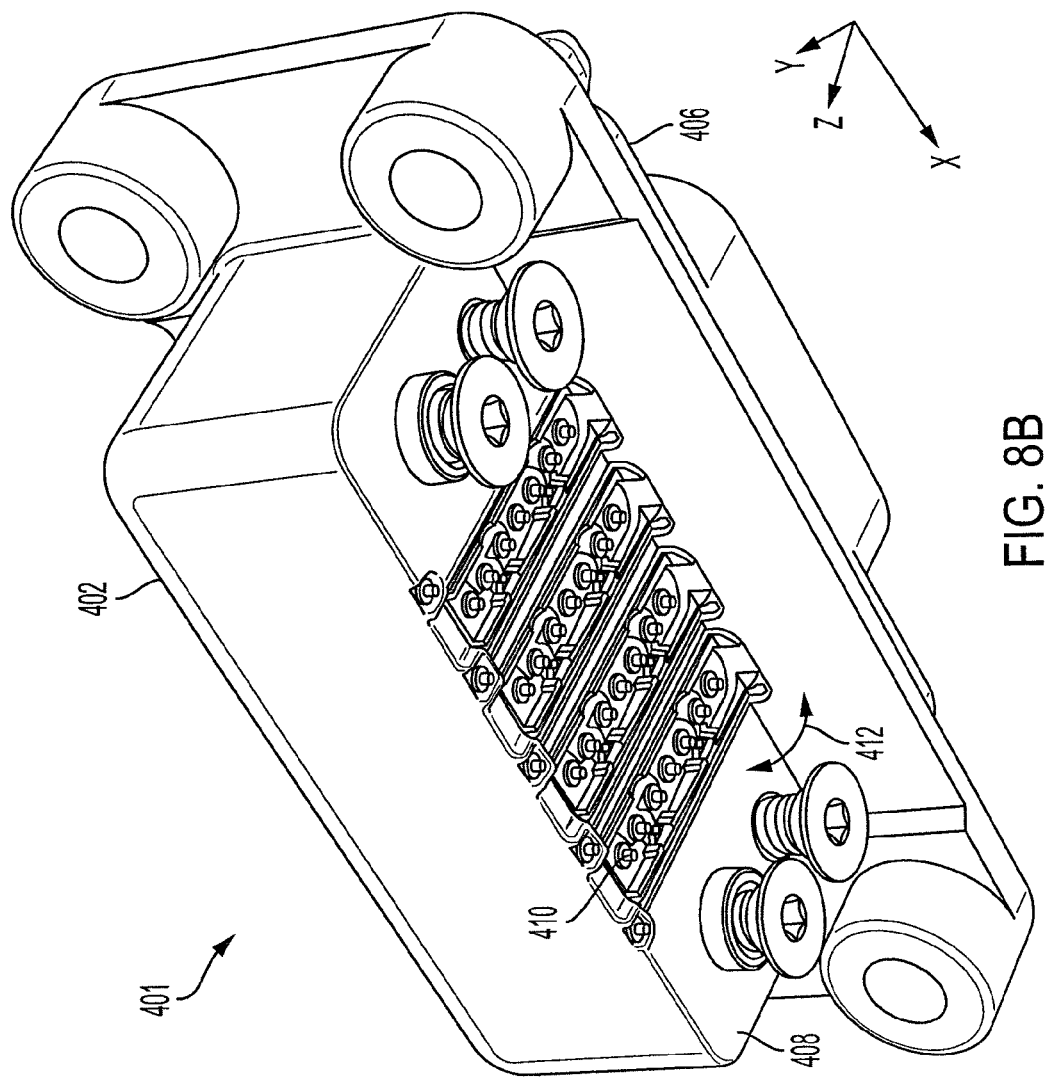
FIG. 8B is a drawing of a back end of the first portion of the highly configurable and modular high-speed connector system of FIG. 8A according to an embodiment of the present disclosure.

Referring now to FIGS. 8A and 8B, another shielded modular connector system 400 may include a first portion 401 and may interface with a second portion, such as the second portion 200 of FIG. 4B. The first portion 401 may include a housing 402 that defines a plurality of bays 404 and includes an interface surface 406 and a back end 408. The plurality of bays 404 may each be designed to receive one of a plurality of contact modules 409. The interface surface 406 is designed to interface with an interface surface of a complementary second portion, such as the second portion 200 of FIG. 4B.

The back end 408 may include connectors 410 which may be connected to a PCB. For example, the connectors 410 may be soldered to, press fit with, or otherwise engage a PCB. The back end 408 may extend at an angle 412 relative to the interface surface 406. The angle 412 may be 180 degrees, as with the first portion 100 of FIG. 1, or may have a different angle. For example, the angle 412 may be between 50 degrees and 130 degrees, between 70 degrees and 110 degrees, or about 90 degrees. Where used in this context, about refers to the referenced value plus or minus 10 percent of the referenced value.

Figure 9:
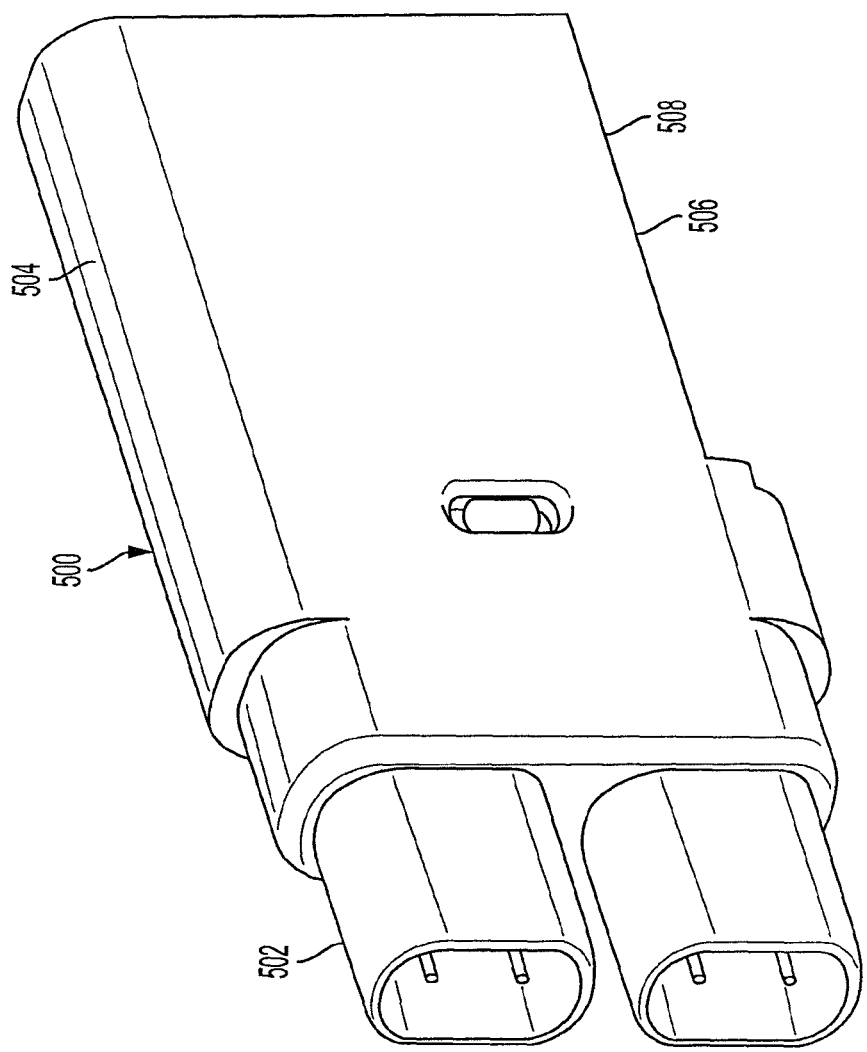
FIG. 9 is a drawing of a contact module usable in the first portion of FIG. 8A according to an embodiment of the present disclosure.

Referring to FIGS. 8A, 8B, and 9, a contact module 500 may be used in the first portion 401. In that regard, the contact module 500 may be installed or received by one of the bays 404. The contact module 500 may include an interface surface 502 designed to form a part of the interface surface 406. The interface surface 502 may at least one of mechanically or electrically interface with an interface surface of a complimentary contact module.

The contact module 500 may further include a main body 504 designed to be received by the housing 402, such as in one of the bays 404.

The contact module 500 may further include a back end 506, designed to form a part of the back end 408 of the first portion 401. The back end 506 may include a connector 508 designed to be mounted or otherwise connected to a PCB. A signal, such as a high-speed signal, a low-speed signal, a power signal, an optical signal, or the like, may be received by the interface surface 502 and transmitted by the connector 508. The signal transmitted by the connector 508 may have the same or similar properties as the signal received by the interface surface 502. Likewise, a signal may be received by the connector 508 and the same or a similar signal may be transmitted by the interface surface 502.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A shielded modular connector system comprising:
a radiation hardened first portion having a first housing made of a metal or a conductive polymer, and a plurality of first contact modules, the first housing having:
a first interface surface and a first interface perimeter surrounding the first interface surface,
a first plurality of bays configured to receive the plurality of first contact modules, the first interface surface having an opening for each bay of the first plurality of bays such that the plurality of first contact modules are accessible, and
a grounding ring located along at least a portion of the first interface perimeter; and
a radiation hardened second portion configured to mate with the radiation hardened first portion, and having a second housing made of a metal or a conductive polymer, and a plurality of second contact modules, the second housing having:
a top half and a bottom half each configured to allow separation to adjust the plurality of second contact modules,
a second interface surface and a second interface perimeter surrounding the second interface surface, the second interface surface configured to face the first interface surface when the radiation hardened first portion is mated with the radiation hardened second portion,
a second plurality of bays configured to receive the plurality of second contact modules, the second interface surface having an opening for each bay of the second plurality of bays such that the plurality of second contact modules are accessible, the plurality of second contact modules and the plurality of first contact modules being configured to connect when the radiation hardened first portion is mated with the radiation hardened second portion, and
a backshell located along at least a portion of the second interface perimeter and extending away from the second interface surface, the backshell configured to engage the grounding ring when the radiation hardened first portion is mated with the radiation hardened second portion to provide electromagnetic interference protection to the plurality of first contact modules and the plurality of second contact modules.

2. The system of claim 1, wherein the plurality of first contact modules includes an optical contact module, and wherein the plurality of second contact modules includes a corresponding optical contact module, such that an optical signal is capable of being communicated therebetween when the radiation hardened first portion is mated with the radiation hardened second portion.

3. The system of claim 1, wherein the plurality of first contact modules includes a high speed data contact module, and wherein the plurality of second contact modules includes a corresponding high speed data contact module, such that a high speed electrical signal is capable of being communicated therebetween when the radiation hardened first portion is mated with the radiation hardened second portion.

4. The system of claim 1, wherein the grounding ring occupies an entire first interface perimeter.

5. The system of claim 1, wherein the backshell occupies an entire second interface perimeter.

6. The system of claim 1, wherein the radiation hardened first portion or the radiation hardened second portion is fixedly attached to a printed circuit board.

7. The system of claim 1, wherein the grounding ring extends beyond the first interface perimeter, such that an interference fit is established between the grounding ring and the backshell when the radiation hardened first portion is mated with the radiation hardened second portion.

8. The system of claim 1, wherein at least one of the radiation hardened first portion or the radiation hardened second portion includes an integrated transceiver configured to facilitate active fiber optic signal transmission.

9. The system of claim 1, wherein at least one of the radiation hardened first portion or the radiation hardened second portion is fixedly attached to at least one of an electromagnetic interference (EMI) bulkhead or a faraday cage bulkhead.

10. A shielded modular connector system comprising:
a radiation hardened first portion having:
a first housing made of a metal or a conductive polymer with a first interface surface and a first plurality of bays, and
a first optical contact module and a first high-speed contact module each configured to be received by one of the first plurality of bays; and
a radiation hardened second portion configured to mate with the radiation hardened first portion and having:
a second housing made of a metal or a conductive polymer with a second interface surface configured to interface with the first interface surface and a second plurality of bays, and a second optical contact module and a second high-speed contact module configured to be connected to the first optical contact module and the first high-speed contact module, respectively, and each configured to be received by one of the second plurality of bays;

wherein the second housing has a top half and a bottom half each configured to allow separation to adjust the second optical contact module and the second high-speed contact module.

11. The shielded modular connector system of claim 10, wherein:

the radiation hardened first portion includes a grounding ring located along at least a portion of a first interface perimeter of the first interface surface; and the radiation hardened second portion includes a backshell located along at least a portion of a second interface perimeter of the second interface surface, extending away from the second interface surface, and configured to engage the grounding ring when the radiation hardened first portion is mated with the radiation hardened second portion to provide electromagnetic interference protection to the first optical contact module, the first high-speed contact module, the second optical contact module, and the second high-speed contact module.

12. The shielded modular connector system of claim 11, wherein the grounding ring occupies an entirety of the first interface perimeter, and the backshell occupies an entirety of the second interface perimeter.

13. The shielded modular connector system of claim 11, wherein the grounding ring extends beyond the first interface perimeter, such that an interference fit is established between the grounding ring and the backshell when the radiation hardened first portion is mated with the radiation hardened second portion.

14. The shielded modular connector system of claim 10, wherein at least one of the radiation hardened first portion or the radiation hardened second portion includes a back end having a connector configured to be connected to a printed circuit board.

15. The shielded modular connector system of claim 14, wherein the connector of the back end is configured to be connected to the printed circuit board at an angle of between 70 degrees and 110 degrees relative to the first interface surface or the second interface surface.

16. A shielded modular connector system comprising:

a radiation hardened first portion having:

a first housing made of a metal or a conductive polymer with a first interface surface and defining a first plurality of bays, a first optical contact module and a first high-speed contact module each configured to be received by one of the first plurality of bays, and a grounding ring located along at least a portion of the first interface surface; and a radiation hardened second portion configured to mate with the radiation hardened first portion and having:

a second housing made of a metal or a conductive polymer with a second interface surface configured to interface with the first interface surface and defining a second plurality of bays, a second optical contact module and a second high-speed contact module configured to be connected to the first optical contact module and the first high-speed contact module, respectively, and each configured to be received by one of the second plurality of bays, and a backshell located along at least a portion of the second interface surface and extending away from the second interface surface, the backshell configured to engage the grounding ring when the radiation hardened first portion is mated with the radiation hardened second portion;

wherein the second housing has a top half and a bottom half each configured to allow separation to adjust the second optical contact module and the second high-speed contact module.

17. The shielded modular connector system of claim 16, wherein at least one of the backshell or the grounding ring provides electromagnetic interference protection to the first optical contact module, the first high-speed contact module, the second optical contact module, and the second high-speed contact module.

18. The shielded modular connector system of claim 16, wherein the grounding ring occupies an entire first interface perimeter, and the backshell occupies an entire second interface perimeter.

19. The shielded modular connector system of claim 16, wherein at least one of the radiation hardened first portion or the radiation hardened second portion includes a back end having a connector configured to be connected to a printed circuit board.

* * * * *